March 20, 1956     H. C. HILL     2,738,647
GAS TURBINE ENGINE FRAME STRUCTURE

Filed July 3, 1951     3 Sheets-Sheet 1

INVENTOR.
HENRY C. HILL
BY
Reynolds Beach & Christensen
ATTORNEYS

INVENTOR.
HENRY C. HILL
BY Reynolds Beach & Christensen
ATTORNEYS

March 20, 1956 H. C. HILL 2,738,647
GAS TURBINE ENGINE FRAME STRUCTURE
Filed July 3, 1951 3 Sheets-Sheet 3

INVENTOR.
HENRY C. HILL
BY
Reynolds, Beach & Christensen
ATTORNEYS

United States Patent Office 2,738,647
Patented Mar. 20, 1956

2,738,647

GAS TURBINE ENGINE FRAME STRUCTURE

Henry C. Hill, Seattle, Wash., assignor to Boeing Airplane Company, Seattle, Wash., a corporation of Delaware Application July 3, 1951, Serial No. 234,997

7 Claims. (Cl. 60—39.08)

This invention relates to frame structures for gas turbine engines and is directed to improvements increasing the former advantage of such engines over reciprocating types in respect to simplicity, light weight, small volume, vibration-free operation, and other factors of merit.

The gas turbine engine, involving extremely high operating temperatures, bodies rotating at tremendous speeds and the requirement that a relatively lightweight, small engine structure develop relatively high torque presents serious design problems many of which are relatively new in the field of engine design. While much progress has been made in the perfection of such engines for commercial and military usage certain problems remained to be solved. One such problem experienced involved vibration resonance in the frame. At the tremendous rotational speeds of the turbine and compressor wheels, namely in the vicinity of 36,000 R. P. M., previous types of frame structures exhibited complex modes of vibration which probably could be eliminated, if at all, only by inconvenient mounting arrangements together with considerable increase in the mass and bulk of the frame to achieve the necessary strength and rigidity in all planes of stress and vibration. Moreover, dynamic deflections and misalignments were observed between the two major engine sections, namely the gas producer and the power output sections, caused by high and variable torque loadings. These also seem to depend for a solution upon a heavier and bulkier frame. However, as gas turbine engines otherwise satisfactory in most respects can and have been built at approximately one-fourth the volume and one-seventh the weight of conventional diesel engines of comparable horsepower, for instance, an improved frame structure became an important goal, especially for motor vehicle and like applications.

An object of the present invention, therefore, is to eliminate vibration resonance and torque deflection conditions in engines of the gas turbine type by providing an improved frame structure, of minimum weight and size, and of simple, convenient design, solving these problems. A related object is such an engine frame which permits arranging the engine parts for greater compactness and easier accessibility to the various parts. Furthermore, it was a purpose to provide a frame arrangement affording natural shielding of the more heat vulnerable accessories of the engine against the intense radiation of heat from the turbine nozzle box.

Another object of the invention is a gas turbine engine frame adapted for installational mounting in a manner and by an arrangement of suspension mounts further minimizing vibration resonance conditions and torque displacements.

Still another and important object is an engine frame structure achieving the foregoing objectives and utilizing main structural elements in the additional capacity of armor effective to protect bystanding personnel and equipment against possible dangers from a bursting turbine wheel.

Under previous concepts of engine frame design the starting point was the provision of a generally flat bed or base upon which the various engine components were mounted by and between upright frame parts, a type of design entirely befitting reciprocating engines. Rigidity and strength of the frame as a whole in former practice was achieved mainly by virtue of mass and size of the base, supplemented in the instance of the reciprocating engine by the inherent rigidity of a cylinder block and head extending the length of the main section or power unit of the engine.

However, in the case of a gas turbine engine the generally flat base alone in the former frame design practice was the major source of rigidity and strength in the frame, as the turbine casing by which the two major operating sections of the engine are joined is of relatively thin metal subjected to extremely high temperatures, hence did not add greatly to structural rigidity in the frame. Under torque loading between the gas producer and power output sections of the engine, the relative flatness and offset position of the base relative to the engine axis precluded effective resistance to torque deflections between the two sections. Increasing the depth and mass of the base added undesired volume and weight to the engine as the price to pay for greater rigidity in the frame. It also increased the dissymmetry of the already unsymmetrical frame structure, which studies leading to the present invention found to sustain complex modes of vibration resulting in frame resonance. Moreover, the only feasible arrangements of engine suspension mounts with previous frames were unsymmetrical and further contributed to vibration and torque deflections.

In accordance with the present invention the engine frame structure herein disclosed comprises longitudinal members, preferably three in number and of tubular form, which extend between symmetrically arranged anchor points on the respective engine sections and are bridged and stiffened transversely by reinforcing plates. The triangularly arranged reinforcing plates also serve as armor, jacketing the turbine housing to protect bystanding persons and objects against possible dangers from bursting turbine wheels. Because of its special form the weight of such a frame structure is low in relation to its stiffness and resistance to vibrations.

Symmetrically arranged suspension mounts located near the output end of the engine enable supporting the same in a manner conducive to vibrationless operation and minimum torque deflections.

Formerly, it was the practice to mount the accessory components upon an engine frame header located at the compressor housing end of the engine, and relatively unprotected from the intense heat radiation from the turbine nozzle box. Another feature of the improved frame structure herein described is the mounting of the triangularly arranged longitudinal frame members previously mentioned between the output gear housing and an intermediately located frame partition which surrounds the compressor shaft at a location next to the turbine housing and is structurally integrated with the gas producing section of the engine. This structural partition serves as a heat-shielding mount for the the auxiliary components and also as a casing for power take-off gearing driving the same from the compressor shaft.

The foregoing and other features, objects and advantages of the invention will become more fully evident from the following detailed description of the presently preferred form of gas turbine engine frame structure embodying the invention, as illustrated in the accompanying drawings.

Figure 2:
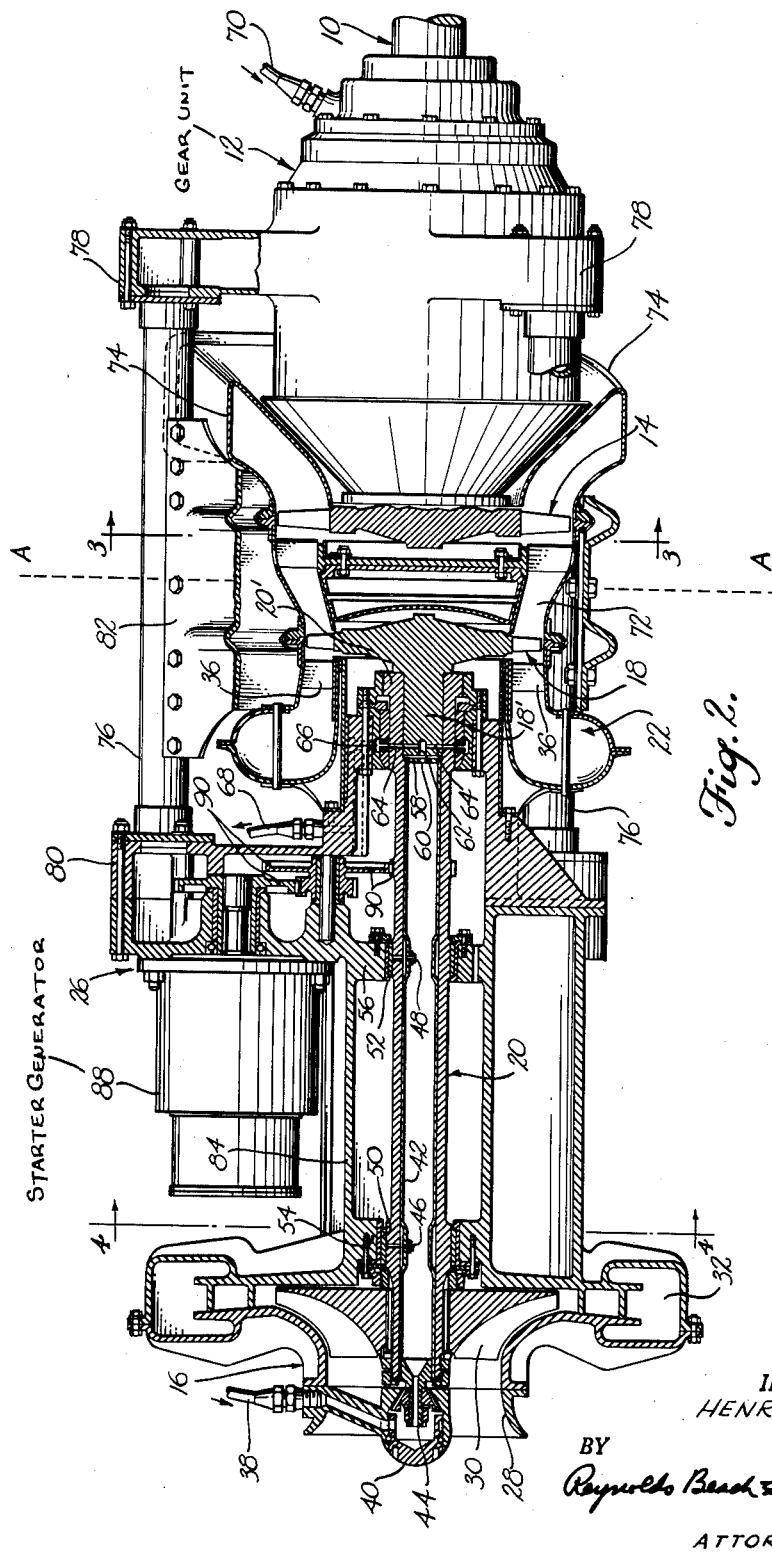
Figure 2 is a longitudinal sectional view of the same with parts broken away to illustrtae certain details.

In Figure 2 that portion of the engine lying generally to the right of the dotted line A—A constitutes the power output section of the engine, and that to the left of the line the gas producing section thereof. The power output section includes the power output shaft 10, the power output gear box 12 and the main power turbine wheel 14 which develops the power for driving the shaft 10 through gear unit 12. The gas producing section of the engine generally comprises the air compressor 16, the first-stage turbine 18 driving the air compressor by means of the shaft 20, the nozzle box 22, the burner ducts 24 interconnecting the nozzle box and air compressor, and the auxiliary components and mount 26.

At the head end of the engine, air is admitted into the compressor 16 through a throat 28 and by centrifugal pumping action of the vaned wheel 30 is driven into the annular collector chamber 32. The compressed air is led off through two elbow ducts departing tangentially from the collector chamber to take advantage of the circumferential velocity of air therein caused by rotation of the centrifugal pumping wheel 30. The two elbow ducts 34 carry the air into the burner chambers or ducts 24 in which fuel is injected by suitable nozzles (not shown) for combustion purposes. The hot gases of combustion pass into the turbine nozzle box 22 extending annularly around the hub of the turbine wheel 18. Such gases then flow parallel to the turbine axis through turbine nozzles 36 directed against the blades of the first-stage turbine 18. Power is thus generated to drive the air compressor wheel 30 by means of the shaft 20.

A system of lubrication is illustrated in Figure 2, which is disclosed and claimed in my copending application Serial No. 246,887, filed September 17, 1951, now Patent No. 2,676,458. Briefly, the lubricant, which in that system is also the fuel, is delivered by a pipe 38 to the hollow interior of a receptacle 40 located at the hub of the compressor wheel 30. The hollow compressor shaft 20 receives an elongated dirt collector tube 42 extending substantially throughout the full length of such shaft. This tube carries an inlet nozzle 44 which enters the receptacle 40 to admit lubricant therefrom into the interior of the tube. The nozzle is appropriately journaled and sealed against leakage in the inner end of the receptacle. The high speed of rotation of the shaft 20, hence of the tube 42 therein, subjects the lubricant in the tube to high centrifugal force causing dirt particles and other relatively heavy foreign elements to be flung radially outward and remain against the wall of the tube, while the lighter and purer lubricant remains in a central core region in the tube. This core fluid is drawn off by tap tubes 46 and 48 acting as individual centrifugal pumps to lubricate the respective antifriction bearings 50 and 52, by which the compressor shaft is rotatably supported in the engine frame journals 54 and 56, respectively.

At the turbine end of the tube 42 the closure plug 58 has a central aperture 60 through which the pure lubricant at the center of such tube is admitted into the inlet of a centrifugal pump. This pump is formed by a central bore 62 and a plurality of communicating radial bores 64 in the hub assembly of the turbine 18, comprising the flanged end 20' of the compressor shaft 20 receiving the stub shaft 18' of the turbine 18. An annular collector duct 66, formed in the hub bearing assembly, receives the lubricant pumped by the radial bores 64 and delivers it to an outlet pipe 68 which, as explained in said copending application, delivers such lubricant to the output gear unit 12 by means of pipe 70, and, as fuel, to the engine burners (not shown).

After passing the first-stage turbine wheel 18, the hot gases in the turbine casing annular duct 72 are directed against the main power turbine wheel 14 and ultimately out into the atmosphere through the exhaust ducts 74.

Figure 1:
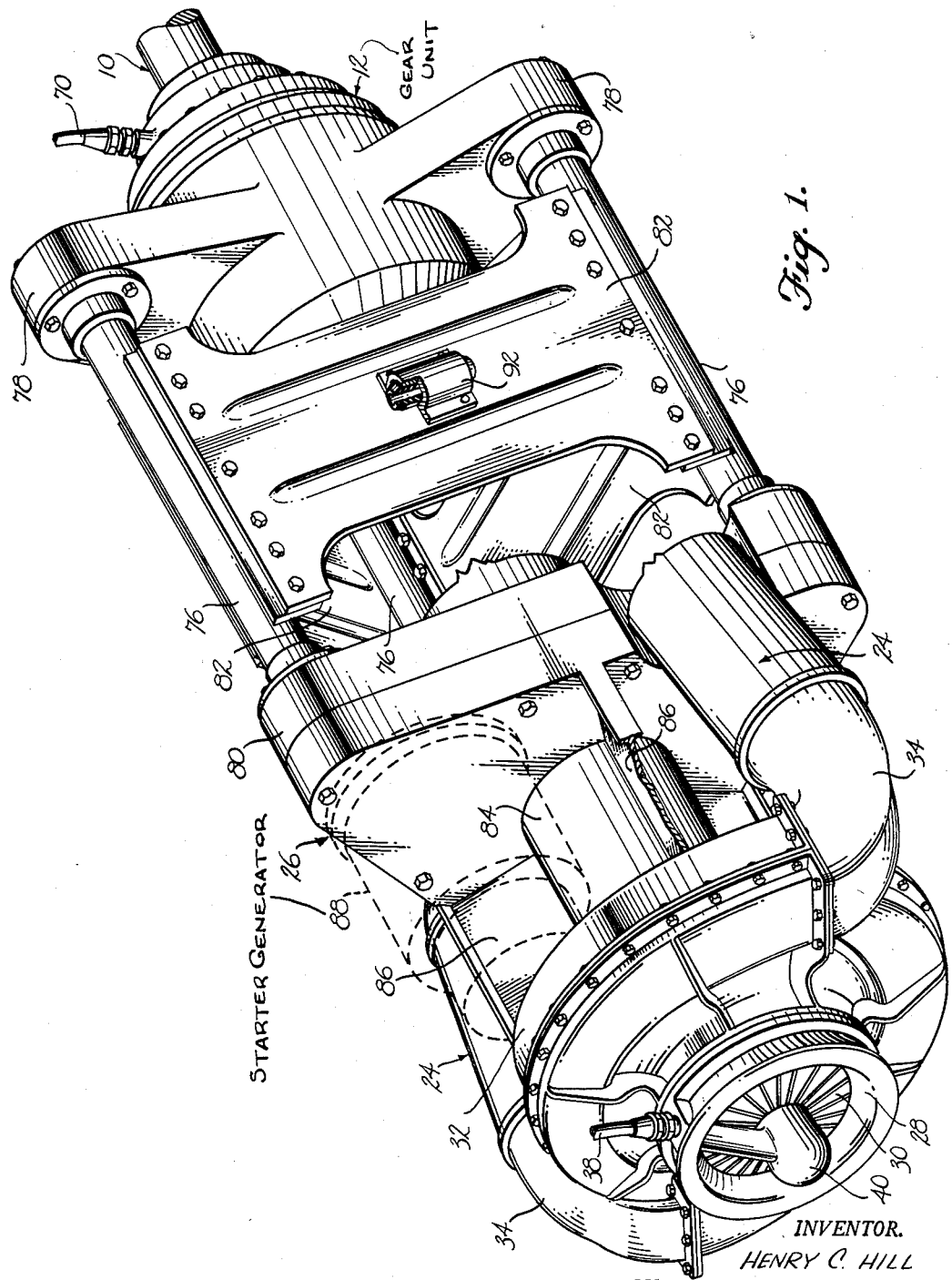
Figure 1 is a perspective view of an engine incorporating the improved frame structure.

In accordance with the present invention the power output and the gas producing sections of the engine are supported in fixed relation to each other by a frame structure comprising three triangularly arranged longitudinal frame members 76 disposed symmetrically with relation to the longitudinal axis of the engine. As shown in Figures 1 and 2 the right-hand ends of these tubular frame members 76 are rigidly, but removably, fastened to the radial arms 78 projecting in equilateral positions from the output gear housing 12. The opposite or left-hand ends of the frame members 76 are correspondingly connected to the respective three corners of a generally triangular frame partition 80 located adjacent the turbine nozzle box 22. Such transverse partition also serves as a housing for auxiliary component drive gearing 90 and as a mount for the auxiliary components, including starter-generator unit 88, booster pumps (not shown), tachometer (not shown) and others.

The frame members 76 are preferably of tubular form, while the radial frame arms 78 and drive gear housing 80 are likewise of hollow construction. As a result, maximum strength and rigidity of these interconnected frame components is achieved with minimum weight, and their interiors may be placed in communicatioin with one another to provide oil and vent passages between the first and second sections of the engine. The interconnected members 76, 78 and 80 form a rigid structure which is symmetrical in relation to the engine axis and offers the requisite degree of stiffness between the two major sections of the engine against vibration, torque deflection, and other longitudinal and transverse components of strain.

The main frame structure interconnecting the two engine sections is completed by the triangularly arranged web plates 82 bridging between the frame tubes 76 in the manner shown and removably connected thereto. The width of such webs parallel to the longitudinal axis of the engine is about half the length of the frame tubes 76, although the dimension is not critical. Such reinforcing plates greatly increase the torsion resistance of the frame, and generally stiffen the frame structure against transverse vibrational tendencies and bending.

The removable connections of the members 76 to the arms 78 and housing 80 and the removable connections of the web plates 82 to the members 76 facilitate disassembly and of maintenance and repairs on the engine.

The frame web plates 82 arranged in prismatic form are preferably of structural steel. Although these plates form a jacket surrounding the turbine casing, they are not heated as greatly during operation of the engine as the turbine casing because of the air circulation permitted between such plates and the turbine casing, and because of direct radiation occurring from the plates. Consequently, their desired rigidity may be achieved without making them abnormally thick. Because of their encompassment of the turbine wheels, the plates 82 serve as armor guarding against possible dangers from a bursting turbine wheel. The fragments of a bursting turbine wheel breaking through the turbine housing would strike the plates and merely ricochet around the space between them.

That portion of the frame structure comprised in the gas producing section of the engine is likewise generally symmetrical in relation to the engine axis. The generally triangular gear housing 80 is rigidly connected to the compressor housing by a sleeve 84 surrounding the compressor shaft 20 and supporting the journals 54 and 56 in which such shaft rotates. Radial rib plates 86 at 120-degree angular spacing on the sleeve 84 interconnect and brace these two housings. In the sectoral spaces between plates 86 the various engine auxiliary components are respectively mounted, including the starter-generator 88 and others supported directly by the partition structure 80 on the side thereof away from the turbine nozzle box. The various auxiliary components are thus grouped in generally symmetrical fashion around the relatively small-diameter sleeve 84 generally within the outline of the engine's frame structure, hence do not impair the overall compactness of the engine. Moreover, being arranged as they are about sleeve 84 such components are easily accessible for installation and removal.

The partition structure 80 serves as a main structural portion of the frame, as a housing for gearing 90 by which the different auxiliary components are driven from the compressor shaft, and as a support carrying the auxiliary components in convenient locations and in compact arrangement, also serves the important function of a heat shield preventing destructive heat radiation reaching the different auxiliary components from the intensely heated turbine nozzle box 22. These components are not greatly heated by the adjacent burner ducts 24, as temperature in the shells of these ducts is relatively low because of coolness of air received therein from the compressor.

Three engine rubber suspension mounts 92 at symmetrical locations on the respective reinforcing plates 82, and near the power output end of the engine, provide a suspension mounting for the engine which minimizes vibrations and torque displacements of the engine as a whole in relation to the supporting structure in which it may be mounted.

Figure 4:
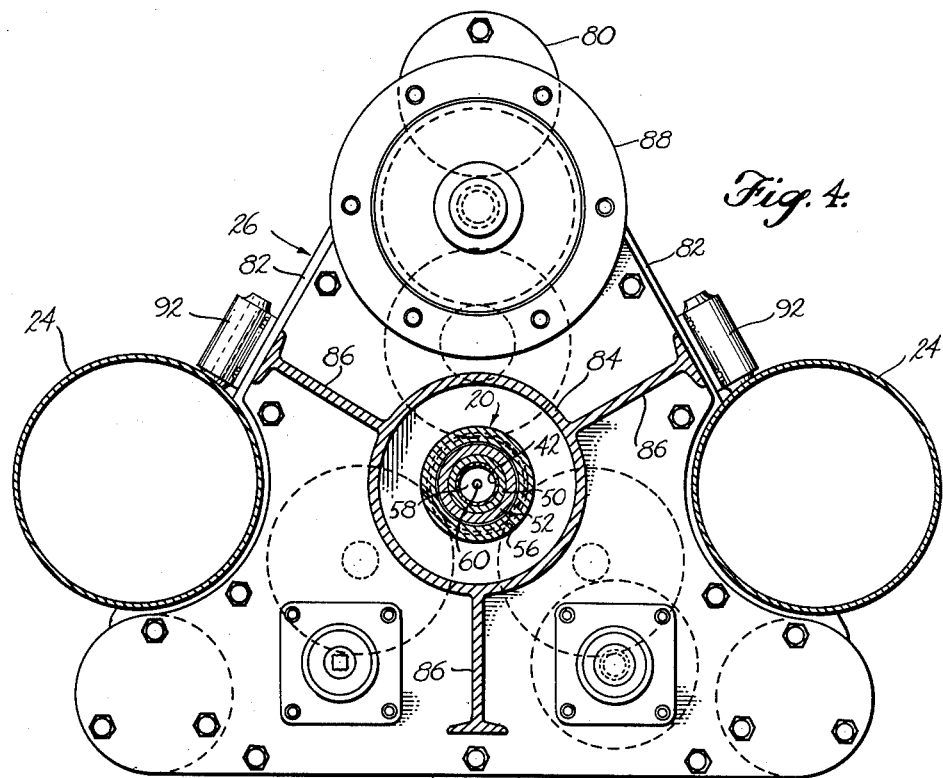
Figure 4 is a transverse sectional view taken on line 4—4 in Figure 2.
Figure 3:
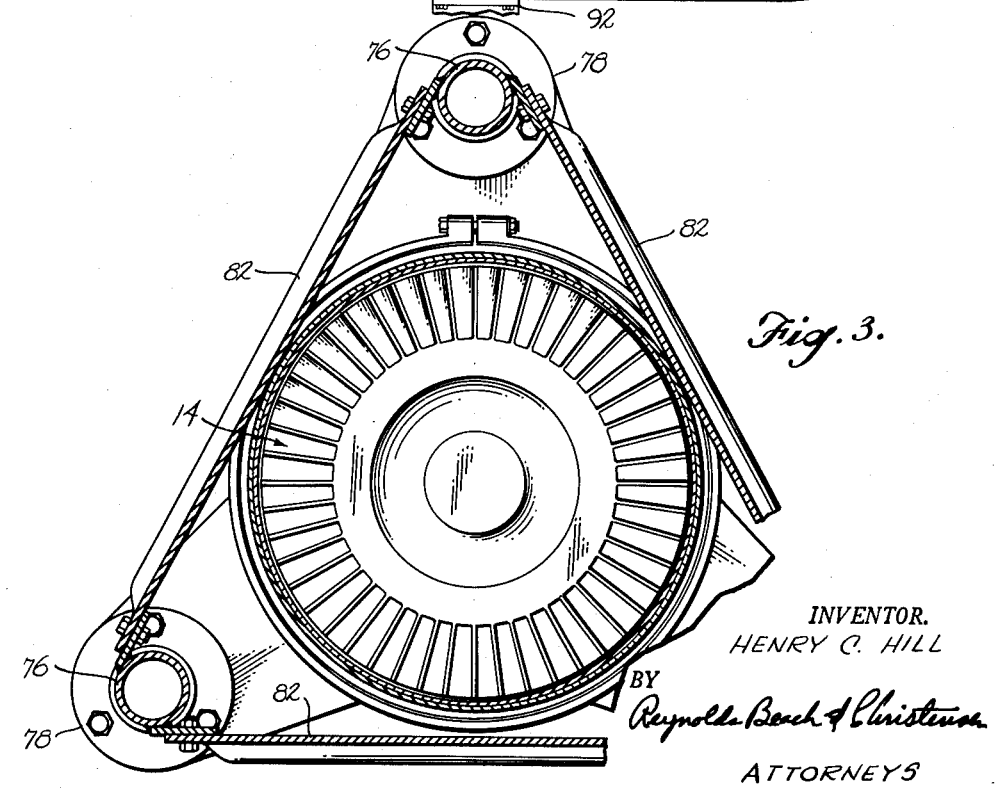
Figure 3 is a transverse sectional view taken on line 3—3 in Figure 2.

It will be noted in the drawings, and especially in Figures 3 and 4, that there is a slight dissymmetry in the arrangement of tubes 76 relative to the engine axis. This is necessitated in the particular engine represented in order to afford clearance for the two burner ducts 24. However, the slight amount of unbalance resulting therefrom in the frame structure is not objectionable from the standpoint of vibration or otherwise. The term "symmetrical," therefore, includes symmetrical and substantially symmetrical forms and arrangements.

I claim as my invention:

1. The frame structure for gas turbine engines having a power output section generally aligned axially with a gas producing section, said sections lying generally at opposite ends of the turbine housing interconnecting them, said frame structure comprising generally radially extending rigid frame portions on each of said engine sections and arranged generally symmetrically in relation to the engine's longitudinal axis, and a plurality of transversely spaced longitudinal frame members rigidly interconnecting said respective frame portions and arranged in generally symmetrical pattern with relation to said axis, around the turbine housing, said power output section and gas producing section having a common lubricating means requiring flow of fluid between such sections attending lubrication thereof and the longitudinal frame members are of tubular form whereas the rigid frame portions have hollow interiors communicating with the interior of at least one such tubular frame member to constitute a passage sustaining said flow of fluid between the engine sections.

2. A frame structure for gas turbine engines having a power output section and a gas producing section generally aligned axially therewith, said sections lying generally at opposite ends of the turbine housing, said frame structure comprising generally radially extending rigid frame portions on each of said engine sections substantially symmetrical about the engine's longitudinal axis, a plurality of transversely spaced longitudinal frame members of tubular form rigidly interconnecting said respective frame portions and grouped symmetrically about the engine's longitudinal axis, and a plurality of reinforcing structure web members of substantially flat plate form rigidly interconnecting the respectively adjacent frame members and being of a width measured longitudinally of the engine sufficient to strengthen the frame structure materially against torsion deflection between engine sections and at the same time provide a jacket surrounding the sides of the turbine housing to protect against danger of outwardly thrown fragments of a bursting turbine wheel, said web members being removably connected to the respective longitudinal frame members, and said longitudinal frame members being removably connected to the radially extending frame portions.

3. A frame structure for gas turbine engines having a power output section and a gas producing section generally aligned axially therewith, said sections lying generally at opposite ends of the turbine housing, said frame structure comprising generally radially extending rigid frame portions on each of said engine sections substantially symmetrical about the engine's longitudinal axis, a plurality of transversely spaced longitudinal frame members rigidly interconnecting said respective frame portions and grouped symmetrically about the engine's longitudinal axis, a plurality of reinforcing structural web members of plate form rigidly interconnecting the respectively adjacent frame members and being of a width measured longitudinally of the engine sufficient to strengthen the frame structure materially against torsion deflection between engine sections and at the same time provide a jacket surrounding the sides of the turbine housing to protect against danger of outwardly thrown fragments of a bursting turbine wheel, and a plurality of engine suspension mounts supporting and fixedly connected to the respective web members, intermediate the respective longitudinal frame members, said mounts being substantially coplanar and adapted for external connections to support the engine thereby.

4. The frame structure defined in claim 3, wherein the web members are substantially flat and are removably connected to the respective longitudinal frame members.

5. The frame structure defined in claim 4, wherein the longitudinal frame members are of tubular form removably connected to the radially extending frame portions.

6. The frame structure defined in claim 3, wherein the longitudinal frame members are three in number arranged at equal spacings about the engine's longitudinal axis, and the web members comprise three substantially flat plates interconnecting said frame members.

7. The frame structure defined in claim 3, wherein the power output section and gas producing section have a common lubricating means requiring flow of fluid between such sections attending lubrication thereof, and the longitudinal frame members are of tubular form whereas the rigid frame portions have hollow interiors communicating with the interior of at least one such tubular frame member to constitute a passage sustaining said flow of fluid between the engine sections.

References Cited in the file of this patent

UNITED STATES PATENTS

| | | |
|---|---|---|
| 880,458 | Krause | Feb. 25, 1908 |
| 1,365,275 | Robinson | Jan. 11, 1921 |
| 1,986,435 | Heinze | Jan. 1, 1935 |
| 2,529,958 | Owner et al. | Nov. 14, 1950 |
| 2,539,960 | Marchant et al. | Jan. 30, 1951 |
| 2,591,399 | Buckland | Apr. 1, 1952 |

FOREIGN PATENTS

| | | |
|---|---|---|
| 590,419 | Great Britain | July 17, 1947 |